United States Patent
Jurek

(10) Patent No.: US 8,363,389 B2
(45) Date of Patent: Jan. 29, 2013

(54) SWITCHBOARD WITH UPS AND HORIZONTAL BUSBARS

(75) Inventor: Tomasz Jurek, Bielsko-Biala (PL)

(73) Assignee: General Electric Company, Schenectady, NY (US)

( * ) Notice: Subject to any disclaimer, the term of this patent is extended or adjusted under 35 U.S.C. 154(b) by 243 days.

(21) Appl. No.: 12/918,624

(22) PCT Filed: Dec. 23, 2008

(86) PCT No.: PCT/US2008/088087
§ 371 (c)(1),
(2), (4) Date: Sep. 9, 2010

(87) PCT Pub. No.: WO2009/088755
PCT Pub. Date: Jul. 16, 2009

(65) Prior Publication Data
US 2010/0328851 A1    Dec. 30, 2010

(30) Foreign Application Priority Data
Dec. 28, 2007   (PL) .......................................... 384178

(51) Int. Cl.
*H02B 1/20* (2006.01)
*H02B 13/02* (2006.01)

(52) U.S. Cl. ........................................ 361/639; 361/614

(58) Field of Classification Search .......... 361/600–678, 361/724–727
See application file for complete search history.

(56) References Cited

U.S. PATENT DOCUMENTS

| 6,160,699 A | 12/2000 | Gibson et al. |
| 6,754,066 B2 * | 6/2004 | Doan et al. ..................... 361/600 |
| 8,094,435 B2 * | 1/2012 | Howes et al. ................. 361/614 |
| 2002/0134567 A1 | 9/2002 | Rasmussen |

FOREIGN PATENT DOCUMENTS

| CN | 2504802 Y | 8/2002 |
| EP | 1202415 A | 5/2002 |

OTHER PUBLICATIONS

PCT/US08/88087, Search Report and Written Opinion, Apr. 24, 2009.
The Translated Chinese Office Action issued in connection with corresponding CN Patent Application No. 200880124025.5 filed on Dec. 23, 2008.

* cited by examiner

*Primary Examiner* — Zachary M Pape
(74) *Attorney, Agent, or Firm* — GE Global Patent Operations; Catherine Toppin

(57) ABSTRACT

A switchboard including at least four conductors of horizontal configuration, the conductors secured to the switchboard to maintain the horizontal configuration, wherein at least one of the four conductors of horizontal configuration is an AC PEN (23) and at least one of the four conductors of horizontal configuration is a DC ground; at least one uninterrupted power supply and battery mounted in the switchboard and operatively connected to the DC ground (23); and at least one uninterrupted power supply and battery mounted in the switchboard and operatively connected to the AC ground (23).

12 Claims, 8 Drawing Sheets

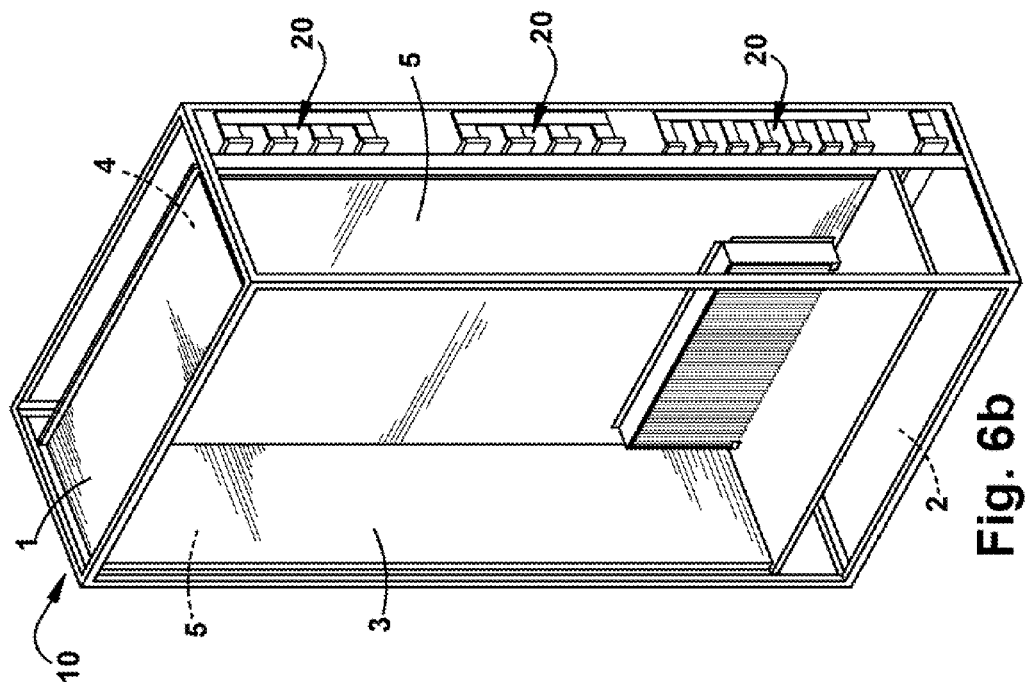
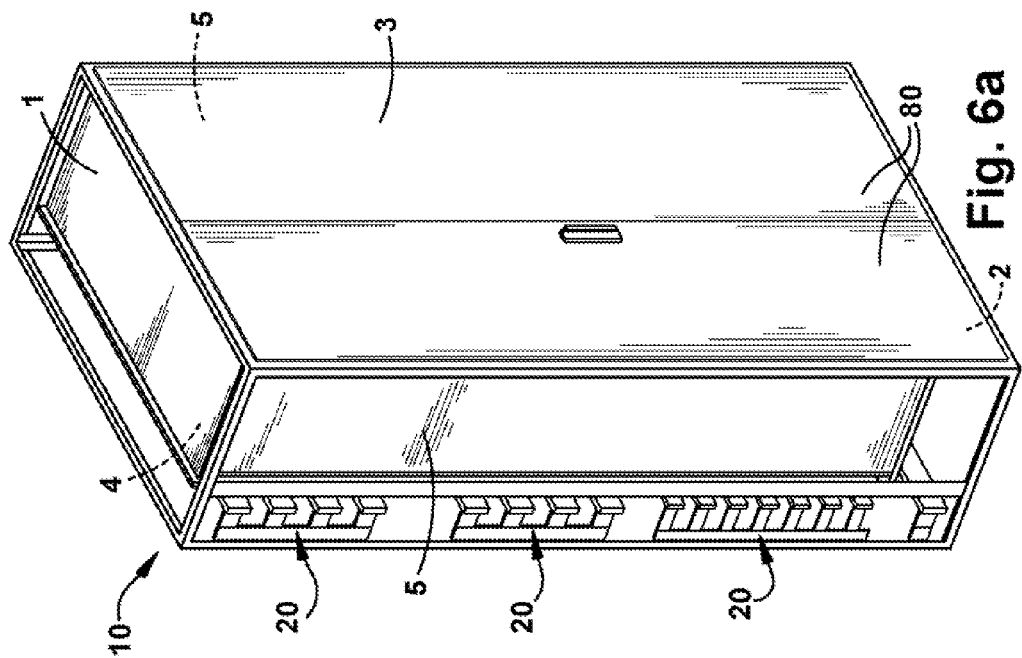

SWITCHBOARD WITH UPS AND HORIZONTAL BUSBARS

BACKGROUND OF THE INVENTION

Field of the Invention

The present invention relates in general to switchboards for electric power distribution systems. More particularly, the invention relates to configuration of buses and components connected in a low voltage switchboard.

Low voltage boards and switchgear assemblies are commonly used in electric power distribution systems such as those typically used to provide power to factories, buildings and commercial installations. Such assemblies are mounted in metal cabinets and include combinations of electrical apparatus for the power distribution systems. Such apparatus typically includes circuit breakers or other switching devices and switching disconnect switches to separate or isolate individual parts of the distribution system. Network protectors may also be included as well as transfer switches used for connection of the system to alternate power sources. Metering equipment and other instrumentation may also be provided.

In an electrical distribution system of a large facility, switchgear is the connection between the power source and the circuits that distribute power to the equipment. The switchgear is an assembly containing electrical switching, protection, metering and management devices for industrial, commercial, and utility applications. A motor control center is a switchgear application designed to control and protect a large facility's motors. Plant supervisory management systems or programmable controllers (PC), or programmable logic controllers (PLC) are process control systems which control electrical switching, protection, metering and management devices in switchgear applications. PCs, PLCs and plant supervisory management systems communicate directly with the devices or processes such as pushbuttons, switches, sensors, control alarms, and starters. The information supplied to the process control systems may include data about each circuit such as status data, current and voltage in each phase of a multi-phase distribution system, electric power, phase angle, trip setting of the circuit breaker, and current reached during trip events. The data can be in the form of discrete inputs/outputs (I/O) such as on/off, or open/closed, as well as data I/O such as current outputs, and voltage outputs.

In many applications, it is desirable to transfer an ac devices receiving power from an ac electric power source, such as electric utility supply feeders, to receive power from a backup power supply such as uninterruptible power supply and a backup generator connected therewith. The phrase "power supply", as used herein, refers to any source of ac electric power such as supply mains, a generator, an uninterruptible power supply, or the like. The phrase "ac devices", as used herein, refers to any ac device or apparatus, such as ac lighting, ac equipment (i.e. industrial equipment) or the like.

Uninterrupted Power Supply (UPS). The device that maintains continuous power supply even on the absence of mains power supply is called UPS or uninterrupted power supply. This is usually connected between the main source and the working system. It switches from the mains power supply to the battery power instantaneously whenever there is a fault in the mains power supply or the power supply is not there at all. It is generally used to protect typically computers, telecommunications equipment, and other electrical equipment where there is a chance of power failure. Sometimes in large systems UPS is used in conjunction with generators but it is not to be confused with standby generators. UPS are used for short and instantaneous power supply needs though for longer terms it may be used with a generator. Some common problems for which UPS are used are: power failure, voltage sag, voltage spike, under voltage or brown out, over voltage, line noise, and harmonic distortion.

There are different types of UPS in the market they are on-line and off-line. The offline variety is also sometimes known as standby UPS. The on-line UPS is continuously provides power supply from its internal source and drains the battery and the battery gets charged continuously. The offline or stand by system connects the power supply to the load through its stabilizer circuit and switches to the battery when there is a problem with the power supply. Other online UPS systems include: line interactive, online single conversion system, delta conversion online, dual conversion online, Ferro-resonant, DC systems, outdoor UPS and fuel cell UPS.

FIG. 1 is an illustration of an exemplary embodiment of a prior art switchboard. Various nonstandard components are illustrated therein. Further, the busbar is in a vertical orientation that is difficult to connect to and does not support the addition of UPS units required by new standards. Hence, as can be inferred, present switchboard products are individually designed modules, built using difficult processes resulting in disadvantages with respect to compatibility, selectivity and monitoring.

SUMMARY OF THE INVENTION

A switchboard apparatus is provided that can be updated more easily in order to accommodate changes in industry standards for switchboards, wherein UPS are required in switchboards. Advantages to the present invention include: 1) substantially uniform busbar connections across the switchboard 10; 2) modular type tested UPS sections; 3) substantially seamless integration with low voltage switchboard sections; and 4) relatively quick and easy connection of multiple UPS sections to the remaining portions of the low voltage switchboard.

An exemplary switchboard apparatus of the present invention includes at least two conductors of horizontal configuration, the conductors secured to the switchboard to maintain the horizontal configuration, wherein at least one of the two conductors of horizontal configuration is an AC PEN and at least one of the two conductors of horizontal configuration is a DC ground. The switchboard also includes at least one uninterrupted power supply and battery mounted in the switchboard and operatively connected to the DC ground; and at least one uninterrupted power supply and battery mounted in the switchboard and operatively connected to the AC ground.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

Further, the purpose of the foregoing Paragraph Titles used in both the background and the detailed description is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Paragraph Titles are neither intended to define the invention or the application, which only is measured by the claims, nor are they it intended to be limiting as to the scope of the invention in any way.

The above-described and other features and advantages of the present disclosure will be appreciated and understood by those skilled in the art from the following detailed description, drawings, and appended claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6a and 6b illustrate various aspects of switchboard construction of an exemplary embodiment of a switchboard of the present invention.

DETAILED DESCRIPTION OF THE INVENTION

Figure 1:
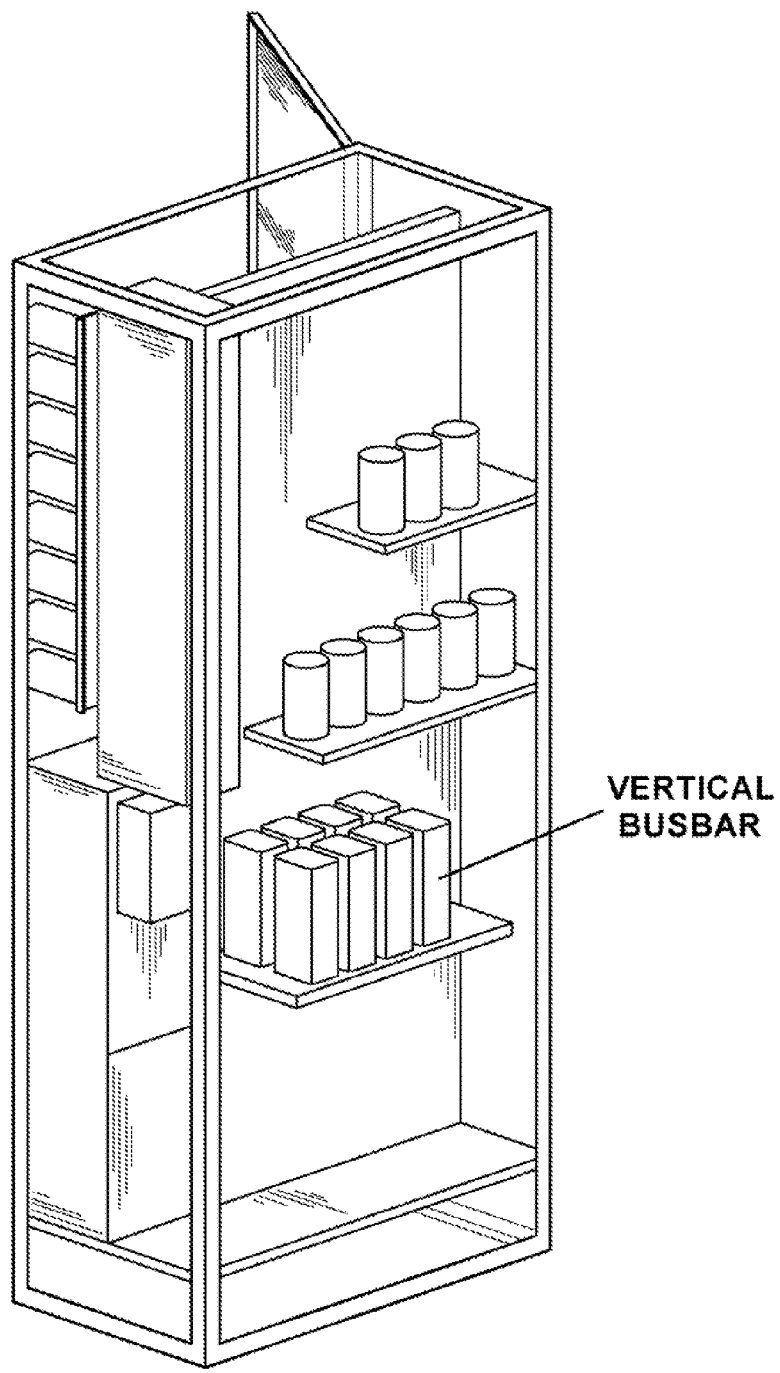
FIG. 1 is an illustration of an exemplary embodiment of a prior art switchboard.

Referring now to the drawings, wherein like reference numerals designate identical or corresponding parts throughout the several views of one or more of the embodiments of the invention will be described. The advantageous aspects of embodiments of the invention described here are novel integrated, type tested, modular system with improved reliability, comprehensive Remote Monitoring & Diagnosis (RM&D) and high level power quality solution.

Industry standards for switchboards have evolved such that new industry standards for critical power applications require that equipment be provided in switchboards with integrated Uninterruptible Power Supplies (UPS). A solution is to provide an embodiment of the present invention wherein at least one UPS, a battery and other equipment are provided in a modular type tested switchboard with a Intelligent Electronic Devices (IED) for example Remote Monitoring and Diagnostic (RM&D) system and intelligent relays and switchgear systems.

Figure 2:
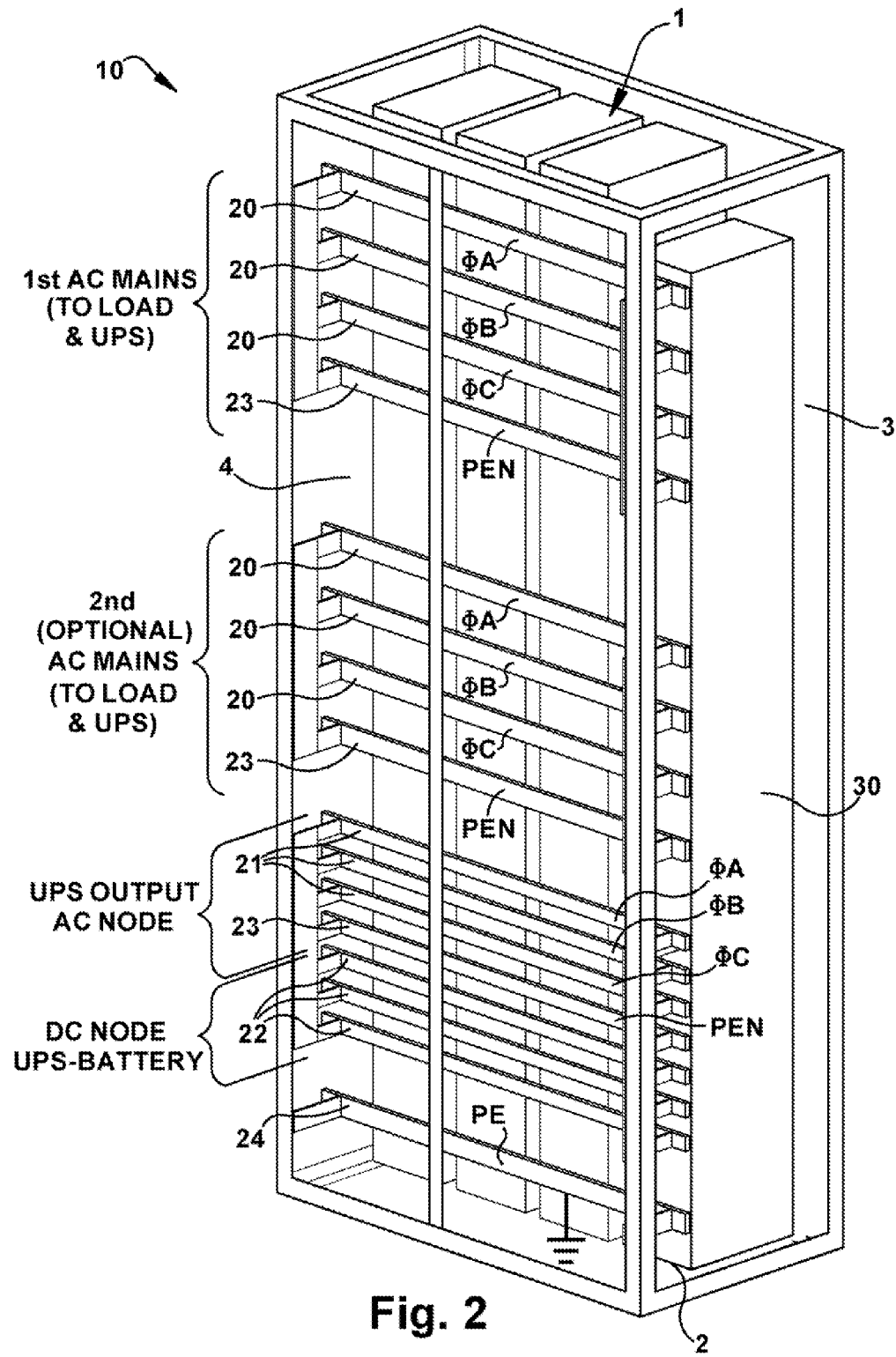
FIG. 2 illustrates a simplified perspective view of an exemplary switchboard of the present invention with horizontally configured busbar and adjacent UPS.

FIG. 2 illustrates a simplified perspective view of an exemplary switchboard 10 of the present invention with horizontally configured busbar 20 and adjacent UPS. Referring to FIG. 2, a perspective view of an exemplary switchboard 10 of the present invention, an illustration of various horizontal busbar 20 is shown. The busbar 20 comprise AC busbar 21 and DC busbar 22, as well as a ground or PEN (Protective Earth & Neutral) 23. The switchboard further comprises at least one UPS 30 and a battery backup 40. In FIG. 2, three UPSs are shown with solid lines for a total of three UPSs are illustrated in a columnar configuration in the switchboard 10. It should be noted that in the exemplary embodiment of the present invention in FIG. 2, the UPS and the battery do not share a single column in the switchboard 10. Due to the columnar configuration of the UPS and battery illustrated, one UPS or one battery can be installed in a single column space in the switchboard 10. One of ordinary skill in the art would understand that if UPSs and batteries for the present invention are available and can fit in a space less than the presently illustrated columnar space, then other UPS-battery configurations could be used. The electrical connection of the more than one UPS 30 to the DC busbar 22 is a parallel connection, as may be determined by one of ordinary skill in the art, and as is provided in multiple power supply configurations (i.e. UPS or other power source).

Figure 3A:
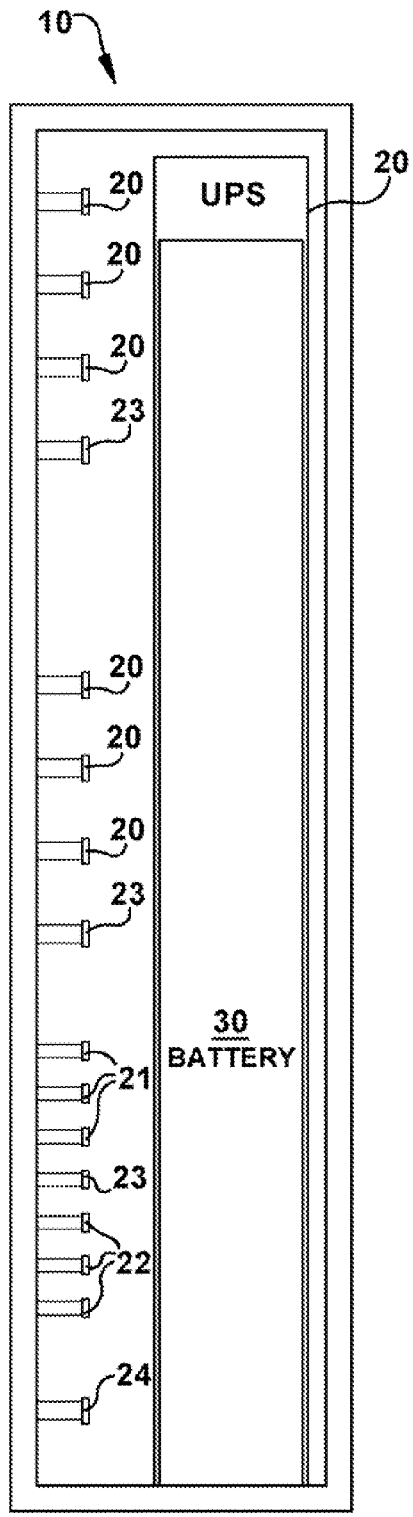
FIG. 3a illustrates a simplified side view of the exemplary switchboard of FIG. 2, with horizontally configured busbar 20 and adjacent columnar battery and columnar UPS.
Figure 3B:
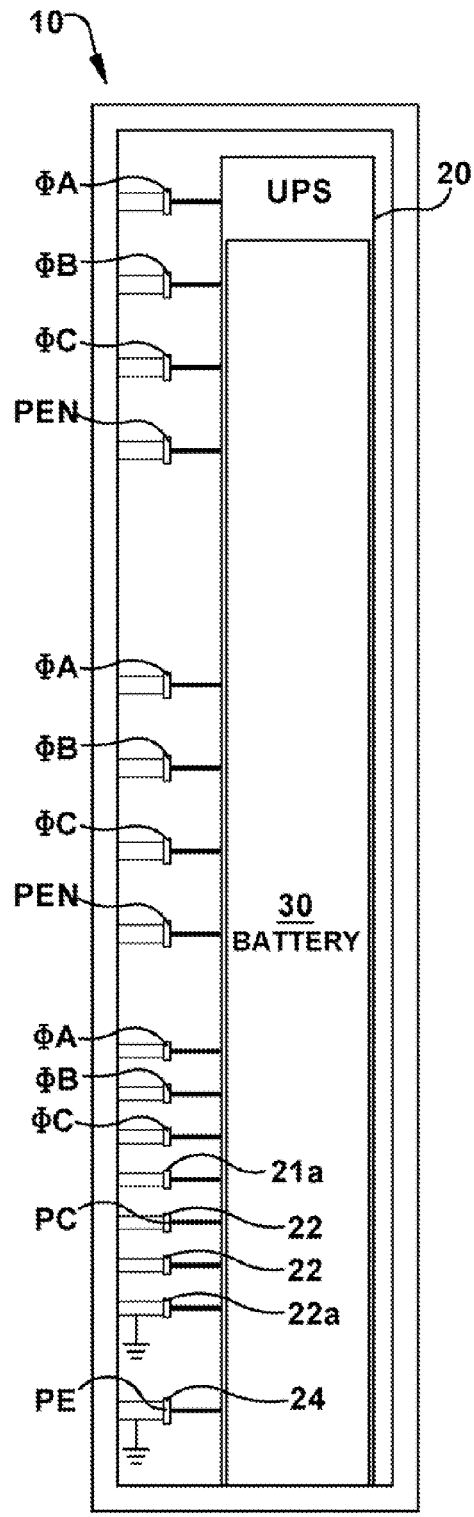
FIG. 3b illustrates a simplified side view of the exemplary switchboard of FIG. 2, further illustrating four exemplary busbar connections to a UPS.

FIG. 3a illustrates a simplified side view of the exemplary switchboard 10 of FIG. 2, with horizontally configured busbar 20 and adjacent columnar battery 20 and columnar UPS 30. The exemplary switchboard, UPS and battery of the present invention can be, for example, SEN Plus and UPS type LP-33-120 kVA with Battery unit from GE Digital Energy, all products of General Electric Company of Schenectady, N.Y. Of course, the specific modules used will vary due to factors such as voltage, current, monitoring needs or other factors that may be determined by one of ordinary skill in the art. The choice of such components may also be determined by one of ordinary skill in the art. FIG. 3b illustrates a simplified side view of the exemplary switchboard 10 of FIG. 2, further illustrating four exemplary busbar connections to a UPS 30. In the example, 1st AC mains or voltage phases A, B and C 20 and PEN 20a of the AC busbars are connected, however other busbar (i.e. 2nd AC mains) and other phases may be used as determined by one of ordinary skill in the art. The four exemplary busbar connections to the UPS 30 are 1) AC input 20 for the UPS 30 (3-phases 20 and PEN 20a); 2) AC output from UPS (3-phases 21 and PEN 21a; 3) DC system for connecting UPS 30 and battery 20 (positive 22, negative 22, ground 22a); and 4) PE or ground 24 of the main busbar of switchgear (ground 24).

The switchboard of FIGS. 1 and 2 includes a top surface 1, a bottom surface 2, a front surface 3, a back surface 4 and a two side surfaces 5. The back surface is proximate to the various horizontal busbar 20. The horizontal busbar sets closest to the top surface are AC power nodes. The horizontal busbar set closest to the bottom surface is a DC power node.

Figure 4:
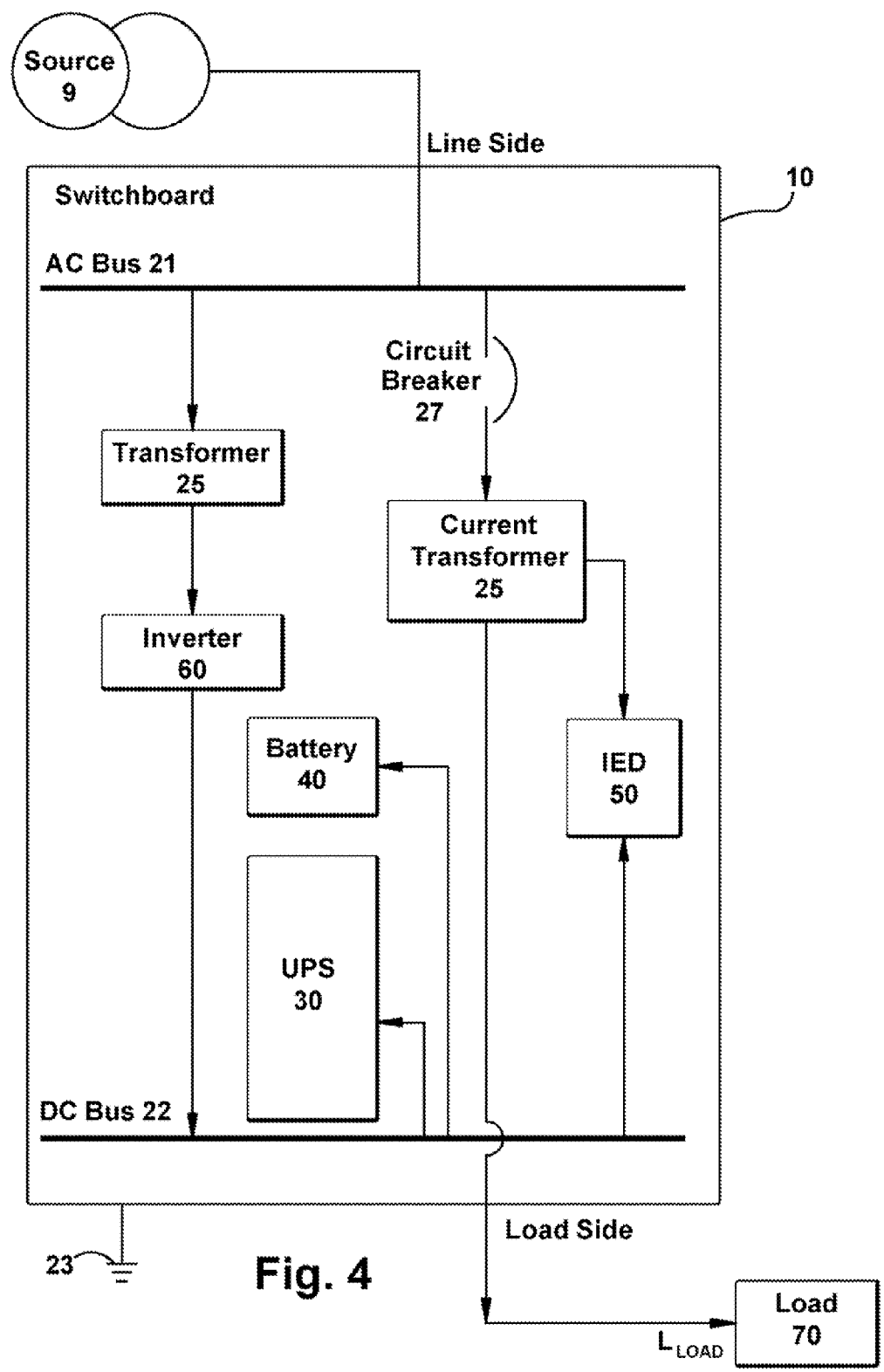
FIG. 4 illustrates an exemplary simplified functional block diagram of a switchboard of the present invention, with horizontally configured busbar.

FIG. 4 illustrates an exemplary simplified functional block diagram of a switchboard 10 of the present invention, with horizontally configured busbar 20. FIG. 4 is simplified in that it includes a single AC Busbar 21 and a single DC Busbar 22; these two busbars 21, 22 are shown for simplification in describing the various component connections in the switchboard 10. A source 9 feeds the AC Busbar 21 via lines side conductor Llme. A load side conductor Lload is fed from the AC busbar 21 via a circuit breaker 27. An Intelligent Electronic Device such as a relay may be included with the switchboard 10 and placement of the IED may be determined by one of ordinary skill in the art. For purposes of illustration, the IED receives a current signal from current transformer 25 located at Lload; hence IED is used to operate circuit breaker 27 if Lload has an undesired current thereon. A DC input to IED 50 is provided for operating power for various functions of the IED as may be determined by one of ordinary skill in the art. A transformer 25 for voltage drop is connected from AC Busbar 21 to an inverter 60, which outputs DC voltage and powers DC Busbar 22.

Figure 7A:
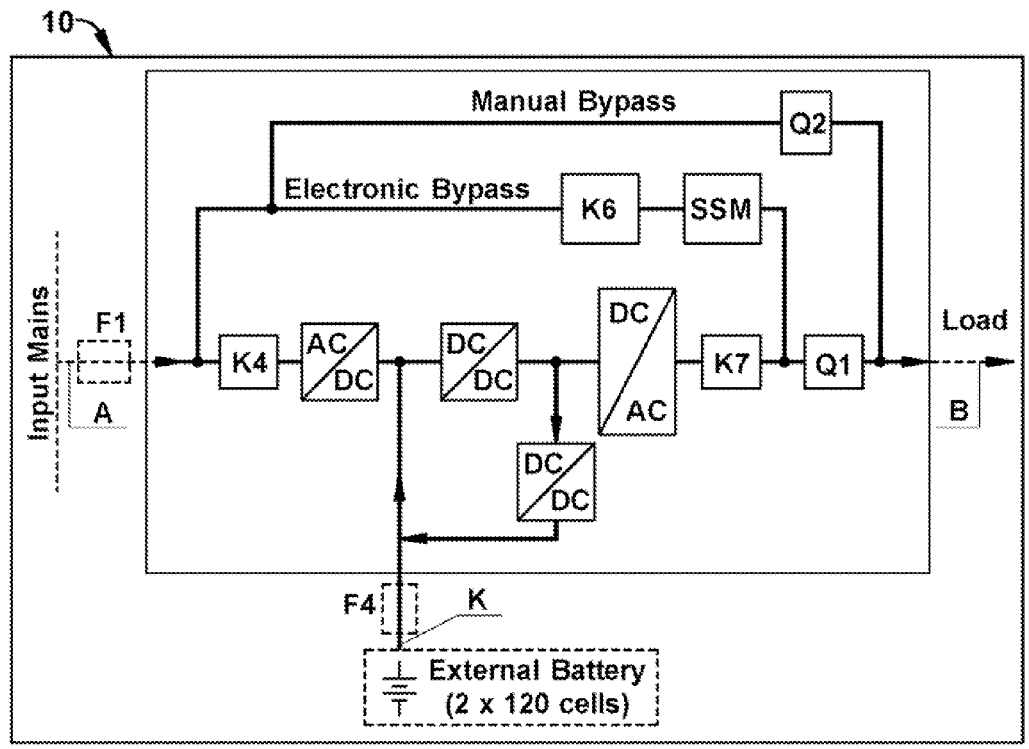
FIG. 7a illustrates an electrical circuit block diagram of various components integrated in an exemplary embodiment of the switchboard of the present invention, including an exemplary four busbar configuration.
Figure 7B:
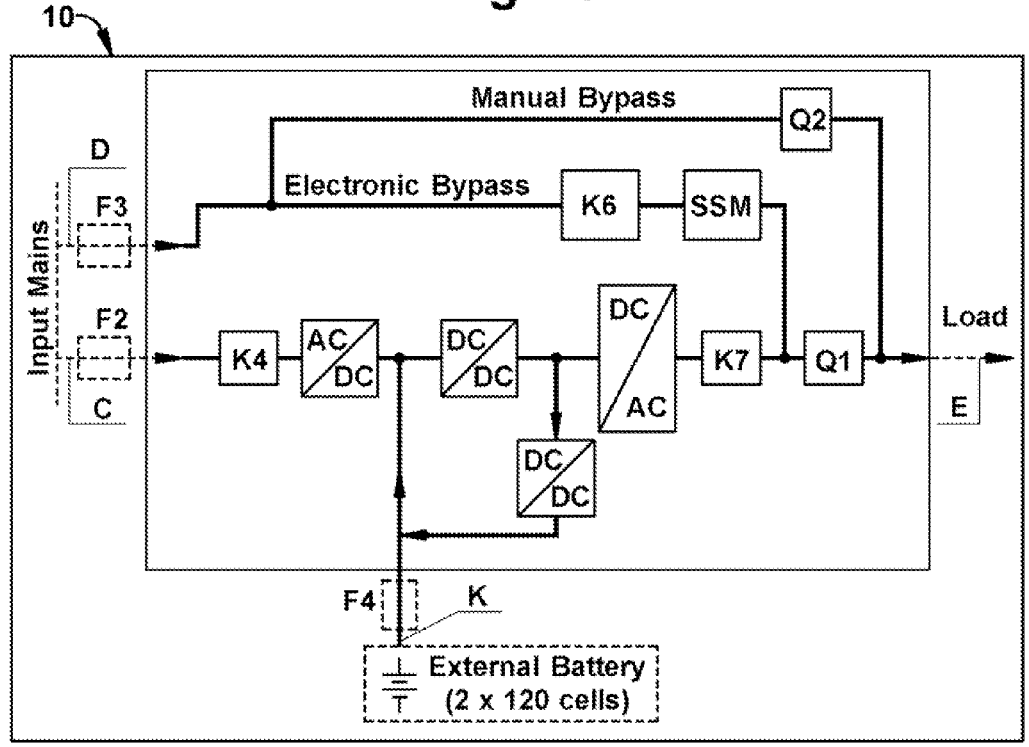
FIG. 7b illustrates an electrical circuit block diagram of various components integrated in an exemplary embodiment of the switchboard of the present invention, including an exemplary five busbar configuration.
Figure 8:
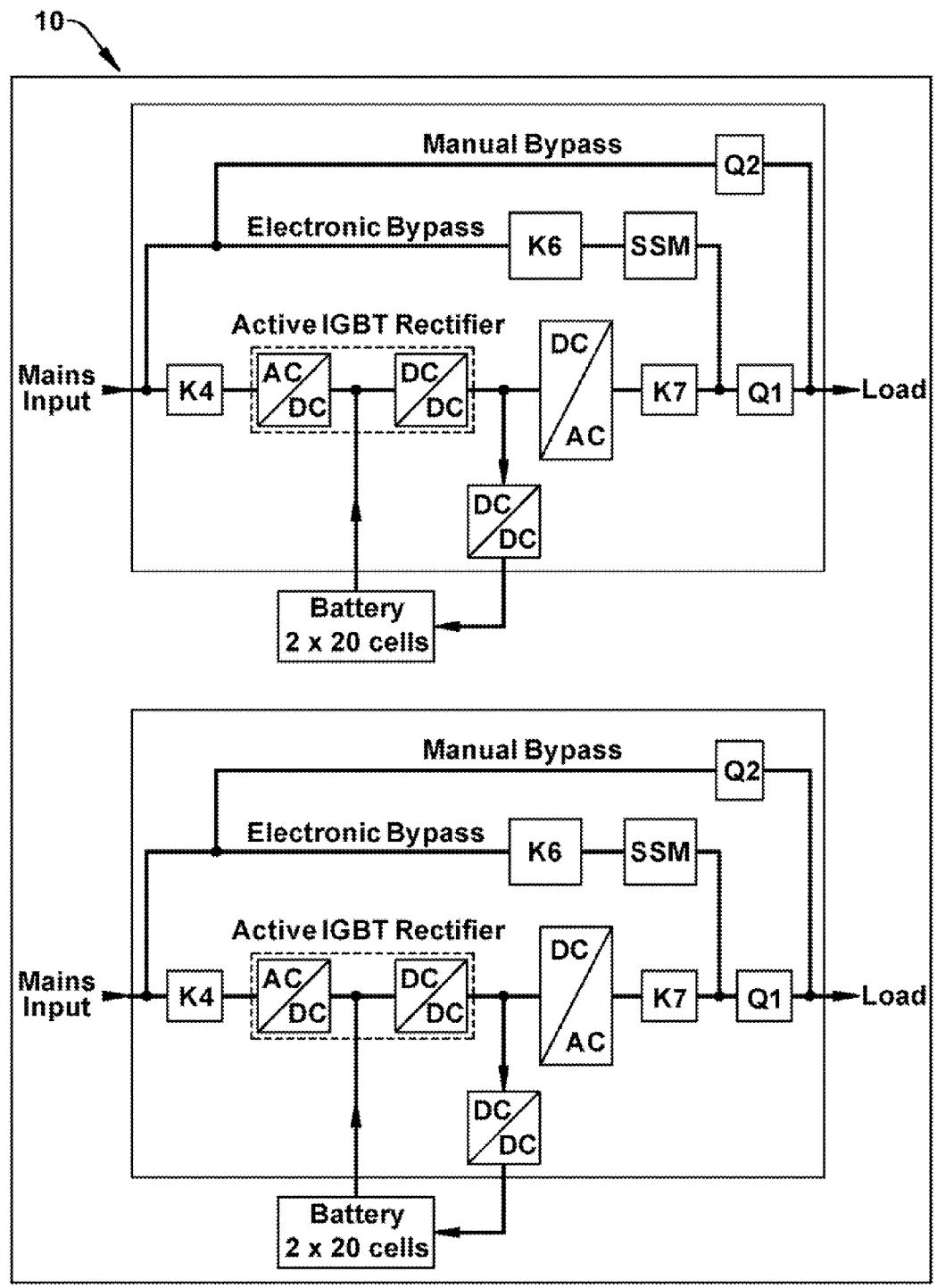
FIG. 8 illustrates an electrical schematic for an exemplary embodiment of the present invention with two UPSs connected electrically in parallel in a switchboard.

At least one UPS 30 is connected to DC Busbar for backup power assistance. Additionally a battery 40 is charged from DC busbar 22 and supplies DC Busbar 22 during periods when the DC busbar is not supplied voltage via AC Busbar 21 and inverter 60. One of ordinary skill in the art can determine the configuration and operation of the DC busbar power and backup power from the battery 40 and UPS 30. Exemplary electrical schematic diagrams for various configurations of the switchboard of the present invention are illustrated in FIGS. 7a, 7b and 8. FIG. 7a illustrates an electrical circuit block diagram of various components integrated in an exemplary embodiment of the switchboard 10 of the present invention, including an exemplary four busbar configuration. FIG. 7b illustrates an electrical circuit block diagram of various components integrated in an exemplary embodiment of the switchboard of the present invention, including an exemplary five busbar configuration. FIG. 8 illustrates an electrical schematic for an exemplary embodiment of the present invention with two UPSs connected electrically in parallel in a switchboard.

Figure 5:
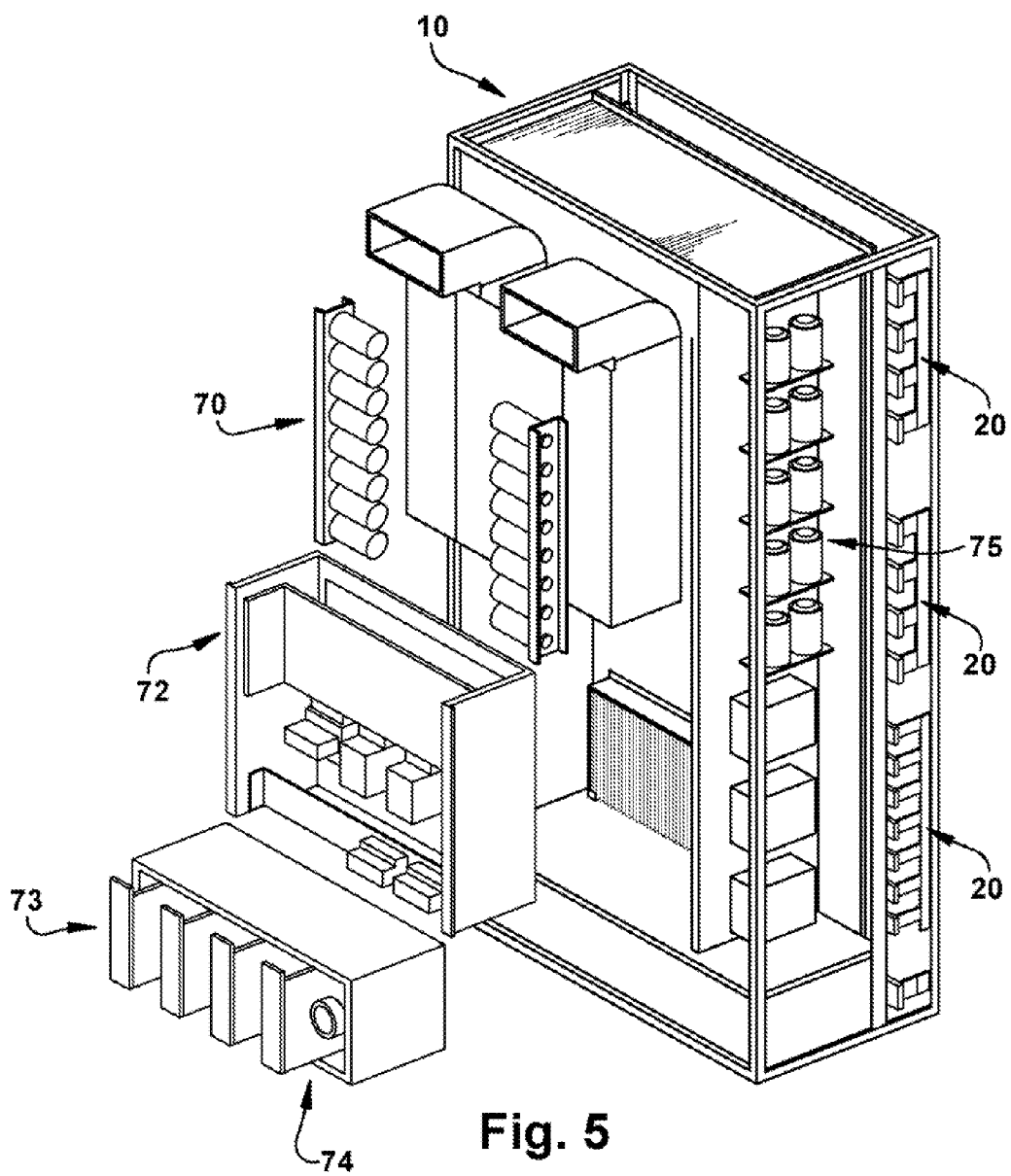
FIG. 5 is an illustration of another exemplary embodiment of a switchboard of the present invention.

FIG. 5 is an illustration of another exemplary embodiment of a switchboard of the present invention. In the exemplary embodiment FIG. 5, of the present invention, EMI chokes 70 are re-positioned as compared to prior position; EMI I/P modules 72 are repositioned; busbar sections 20 are added; the switchboard cabinet 10 is fitted with double doors 80; cable connections 75 to busbars 20 are added; and plug in contacts 73 for I/Os 74 are implemented. FIGS. 6a and 6b illustrate various aspects of switchboard construction of an exemplary embodiment of a switchboard of the present invention.

The present invention overcomes the disadvantages of providing a UPS integrated into a switchboard 10 including: 1) on-site testing of UPS installed with switchboard 10; 2) complex on-site cabling (not shown) between switchboard 10 and UPS 30; and 3) selection of appropriate protective and selective devices 50 upstream (i.e. on the line side) and downstream (i.e. on the load side) of the UPS 30. Further disadvantages of previous switchboards comprising individually designed modules, built together in a process with compatibility, selectivity and monitoring problems are overcome.

The above disadvantages are addressed by embodiments of the present invention which provide: 1) substantially uniform busbar connections across the switchboard 10; 2) modular type tested UPS sections; 3) substantially seamless integration with low voltage switchboard sections; and 4) relatively quick and easy connection of multiple UPS sections to the remaining portions of the low voltage switchboard.

A detailed description of how the invention works or operates, features are detailed herein: An embodiment of the present invention comprises a SEN Plus low voltage switchboard, a UPS type LP-33-120 kVA with Battery unit from GE Digital Energy. The UPS modules and batteries are arranged to fit within a standard switchboard enclosure by providing the enclosure with newly oriented horizontal busbar sets for connecting to equipment that is installed in the switchboard. Connections between busbar sets and UPS terminals are provided using cables. Batteries are available in a freestanding column version that works with the configuration of the inventive switchboard. The above noted GE components are manufactured by General Electric Company of Schenectady N.Y.; other components may be used as may be determined by one of ordinary skill in the art.

In an embodiment of the present invention standard SEN Plus switchboard feeder columns are quipped with a two-busbar system (instead of one) so as to supply the UPS section. The maximum number of UPS devices that can be integrated into the exemplary switchboard of FIGS. 1 and 2 is four; however, one of ordinary skill in the art would understand that other numbers of UPS devices could be provided depending upon the size of the switchboard, the size of the UPS devices and the equipment configured therein the switchboard. One of ordinary skill in the art would also understand that multiple UPS devices in a single power supply configuration are connected in parallel only since power supply devices are restricted to parallel configurations due to electrical circuit theory as would be understood by one of ordinary skill in the art.

There are advantages of the embodiments of the present invention. The invention provides advantages such as accomplishing connection of UPS and battery components in a switchboard. Embodiments of the present invention have advantages such as, for example, improved ease of integration of components, type tested components, modular system, increased reliability, comprehensive Remote Monitoring and Diagnostic (RM&D) and improved power quality. Also, embodiments of the present invention provide a cost savings.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

It should also be noted that the terms "first", "second", "third", "upper", "lower", and the like may be used herein to modify various elements. These modifiers do not imply a spatial, sequential, or hierarchical order to the modified elements unless specifically stated.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A switchboard comprising: at least two conductors of horizontal configuration, the conductors secured to the switchboard to maintain the horizontal configuration, wherein at least one of the two conductors of horizontal configuration is an AC PEN and at least one of the two conductors of horizontal configuration is a DC ground; at least one uninterrupted power supply and battery mounted in the switchboard and operatively connected to the DC ground; and at least one uninterrupted power supply and battery mounted in the switchboard and operatively connected to the AC PEN.

2. The switchboard of claim 1 wherein the at least two conductors further comprises a set of four AC conductors including the AC PEN.

3. The switchboard of claim 1 wherein the at least two conductors further comprises a set of three DC conductors including the DC ground.

4. The switchboard of claim 1 wherein the switchboard is a low voltage switchboard.

5. The switchboard of claim 3 wherein the at least one uninterrupted power supply and battery mounted in the switchboard is operatively connected to the set of three DC conductors including the DC ground and wherein the at least one uninterrupted power supply and battery mounted in the switchboard is operatively connected to a set of four AC conductors including the AC PEN.

6. The switchboard of claim 5 wherein the at least one uninterrupted power supply and battery comprises four universal power supplies connected in parallel to the set of three DC conductors including the DC ground and connected to the set of four AC conductors including the AC PEN.

7. The switchboard of claim 1 wherein the at least one uninterrupted power supply and battery comprises four uninterrupted power supplies connected in parallel to at least one of the at least two conductors of horizontal configuration.

8. A switchboard comprising a top surface, a bottom surface, a front surface, a back surface and a left and right surfaces, the switchboard further comprising: at least one set of four conductors in a horizontal configuration, each of the conductors secured to the switchboard, in an area proximate to the top surface, to securely maintain the horizontal configuration, wherein the at least one set of four conductors in the horizontal configuration are AC power nodes and wherein at least one of the four conductors of each of the at least one set of four conductors in the horizontal configuration is an AC PEN node; at least seven conductors in a horizontal configuration, each of the conductors secured to the switchboard, in an area proximate to the bottom surface, each of the conductors secured to the switchboard to maintain the horizontal configuration, wherein at least four conductors in the horizontal configuration are AC power nodes comprising three AC phases and an AC PEN; at least three conductors in the horizontal configuration are DC power nodes comprising two DC conductors and a DC ground; at least one conductor in a horizontal configuration, the at least one conductor secured to the switchboard, in an area proximate to the at least seven conductors and the bottom surface of the switchboard, wherein the at least one conductor is an AC ground node; and at least one uninterrupted power supply and battery mounted in the switchboard proximate to the at least seven conductors in a horizontal configuration and operatively connected to at least one of the three DC conductors of the DC power nodes and at least one of the three phases of the AC power nodes.

9. The switchboard of claim 8 wherein the switchboard is a low voltage switchboard.

10. The switchboard of claim 8 wherein the at least one uninterrupted power supply and battery comprises four uninterrupted power supplies connected in parallel to the DC power nodes and connected in parallel to the AC power nodes.

11. The switchboard of claim 8 wherein the front surface is double doors.

12. A switchboard comprising a top surface, a bottom surface, a front surface, a back surface and a left and right surfaces: the switchboard wherein the front surface comprises double doors comprising a first door hinged left and a second door hinged right such that when the double doors are open, components in the switchboard can be accessed; a first busbar secured to the switchboard, in an area proximate to the top surface, to securely maintain the horizontal configuration, the busbar operating as an AC power node; a second busbar secured to the switchboard, in an area proximate to the bottom surface, to securely maintain the horizontal configuration, the busbar operating as a DC power node; cable connections proximate to the first busbar and the second busbar and connecting to the first and second busbar modularly;

EMI chokes modularly mounted proximate to the cable connections;

EMI I/P modules mounted proximate to the cable connections and adjacent at one side to the EMI chokes; plug in contacts for I/Os, the plug in contacts mounted proximate to the cable connections and adjacent to the bottom side of the switchboard; a UPS and a battery fitted inside the switchboard and operatively connected to the DC power node.

* * * * *